United States Patent
Adomat et al.

(10) Patent No.: US 10,539,963 B2
(45) Date of Patent: Jan. 21, 2020

(54) DEVICE FOR DETERMINING A SPACE IN WHICH A VEHICLE CAN DRIVE, CORRESPONDING METHOD, AND VEHICLE

(71) Applicant: Conti Temic microelectronic GmbH, Nürnberg (DE)

(72) Inventors: Rolf Adomat, Eriskirch (DE); Wolfgang Fey, Bodolz (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 34 days.

(21) Appl. No.: 15/797,688

(22) Filed: Oct. 30, 2017

(65) Prior Publication Data
US 2018/0046194 A1     Feb. 15, 2018

Related U.S. Application Data

(63) Continuation of application No. PCT/DE2016/200206, filed on May 3, 2016.

(30) Foreign Application Priority Data

May 8, 2015 (DE) .......................... 10 2015 208 590

(51) Int. Cl.
*G05D 1/00* (2006.01)
*G06T 7/70* (2017.01)
(Continued)

(52) U.S. Cl.
CPC ............. *G05D 1/0214* (2013.01); *B60R 1/00* (2013.01); *B60W 30/06* (2013.01);
(Continued)

(58) Field of Classification Search
CPC ....... G05D 1/00; G05D 1/0214; B60W 30/00; B60W 30/06; B60R 1/00; G06T 7/00;
(Continued)

(56) References Cited

U.S. PATENT DOCUMENTS 9,090,260 B2 * 7/2015 Clarke .................. B60W 30/00
9,150,220 B2 * 10/2015 Clarke .................. B60W 30/00
(Continued)

FOREIGN PATENT DOCUMENTS

DE     10312252 A1    9/2004
DE   102005008874 A1   9/2006
(Continued)

OTHER PUBLICATIONS

International Search Report and Written Opinion dated Apr. 19, 2017 from corresponding International Patent Application No. PCT/DE2016/200206.
(Continued)

*Primary Examiner* — Yonel Beaulieu

(57) ABSTRACT

A device for determining a space in which the vehicle can drive includes at least one sensing unit for sensing spatial coordinates of at least one object in a vehicle environment of the vehicle. A determining unit is configured to determine a space in which the vehicle can drive on the basis of the spatial coordinates of the at least one object sensed by the sensing unit and on the basis of specified dimensions of the vehicle.

12 Claims, 3 Drawing Sheets

(51) Int. Cl.
*B60R 1/00* (2006.01)
*B60W 30/06* (2006.01)
*G01S 17/00* (2006.01)
*G01G 1/16* (2006.01)
*G05D 1/02* (2006.01)
*G01S 17/93* (2006.01)
*H04N 5/247* (2006.01)

(52) U.S. Cl.
CPC ............. *G05D 1/0248* (2013.01); *G06T 7/70* (2017.01); *B60R 2300/105* (2013.01); *B60R 2300/303* (2013.01); *B60R 2300/806* (2013.01); *G01S 17/936* (2013.01); *G06T 2200/08* (2013.01); *G06T 2200/24* (2013.01); *G06T 2207/30241* (2013.01); *G06T 2207/30252* (2013.01); *H04N 5/247* (2013.01)

(58) Field of Classification Search
CPC .. G06T 7/70; G08G 1/16; G08G 1/165; G01S 17/00
See application file for complete search history.

(56) References Cited

U.S. PATENT DOCUMENTS

| | | | |
|---|---|---|---|
| 9,156,473 B2 * | 10/2015 | Clarke | ................... B60W 30/00 |
| 9,452,754 B2 * | 9/2016 | Clarke | ................... B60W 30/00 |
| 9,665,100 B2 * | 5/2017 | Shashua | ................. G01C 21/32 |
| 2005/0043871 A1 | 2/2005 | Endo et al. | |
| 2005/0049766 A1 | 3/2005 | Tanaka et al. | |
| 2012/0287232 A1 | 11/2012 | Natroshvili et al. | |
| 2015/0153735 A1 * | 6/2015 | Clarke | .................. B60W 30/00 |
| | | | 701/301 |

FOREIGN PATENT DOCUMENTS

| | | |
|---|---|---|
| DE | 102009032541 A1 | 1/2011 |
| DE | 102010009889 A1 | 9/2011 |
| DE | 102011103743 A1 | 3/2012 |
| DE | 102011102639 A1 | 11/2012 |
| DE | 102011113916 A1 | 3/2013 |
| DE | 102012022336 A1 | 5/2014 |
| DE | 102013207823 A1 | 10/2014 |
| DE | 102013209873 A1 | 12/2014 |
| EP | 2592434 A1 | 5/2013 |
| JP | 2009205191 A | 9/2009 |
| JP | 2012214178 A | 11/2012 |
| WO | WO2011029693 A1 | 3/2011 |

OTHER PUBLICATIONS

German Search Report dated Apr. 15, 2016 for corresponding German Patent Application No. 10 2015 208 590.2.

* cited by examiner

DEVICE FOR DETERMINING A SPACE IN WHICH A VEHICLE CAN DRIVE, CORRESPONDING METHOD, AND VEHICLE

CROSS REFERENCE TO RELATED APPLICATION

This application claims the benefit of International application No. PCT/DE2016/200206, filed May 3, 2016, which claims priority to German patent application No. 10 2015 208 590.2, filed May 5, 2015, each of which is hereby incorporated by reference.

TECHNICAL FIELD

The technical field relates to a device and method for determining a space in which a vehicle can drive.

BACKGROUND

Modern vehicles are often fitted with a parking assistance system as an aid to the driver during parking. From German patent application No. 10 2011 113 916, a parking assistance system is known which classifies a number of parking scenarios.

Parking assistance systems usually monitor just an area around the vehicle in the vicinity of the highway. It is particularly the case that objects located at a higher level, such as a roof box in a garage, are not detected properly.

As such, it is desirable to present a device and method which reliably and accurately determine a space in which a vehicle can drive. In addition, other desirable features and characteristics will become apparent from the subsequent summary and detailed description, and the appended claims, taken in conjunction with the accompanying drawings and this background.

BRIEF SUMMARY

According to one exemplary embodiment, a device for determining a space in which a vehicle can drive comprises at least one sensing unit for sensing spatial coordinates of at least one object in a vehicle environment of the vehicle. The device also includes a determining unit configured to determine a space in which the vehicle can drive on the basis of the spatial coordinates of the at least one object sensed by the sensing unit and on the basis of specified dimensions of the vehicle.

In one exemplary embodiment, a method for determining a space in which a vehicle can drive includes sensing spatial coordinates of at least one object in a vehicle environment of the vehicle. The method also includes determining a space in which the vehicle can drive on the basis of the sensed spatial coordinates of the at least one object and on the basis of specified dimensions of the vehicle.

A vehicle having a device for determining an area in which the vehicle can drive is also described herein. This makes it possible to reliably and accurately determine a space, available to the vehicle, in which the vehicle can drive.

According to a further embodiment of the device, the sensing unit has optical sensors. By utilizing the optical sensors, objects in a vehicle environment of the vehicle can be detected and their spatial coordinates determined.

According to a further development of the device, the sensing unit includes a surround view system. Through the use of the surround view system, by way of example a plurality of cameras configured around the vehicle, an entire area of the vehicle environment of the vehicle can be sensed and measured.

According to a further development of the device, the sensing unit is configured to create a three-dimensional map of at least a part of the vehicle environment of the vehicle, wherein the three-dimensional map includes positions of the at least one object and of the drivable space. This allows both objects close to the ground in the vehicle environment of the vehicle, and objects located at a higher level, such as a roof box in a garage or overhanging objects on other vehicles, to be reliably detected. Using the three-dimensional map, the vehicle can be reliably controlled either by the actual driver or automatically by a suitable control device.

According to a further development of the device, the determining unit calculates on the basis of the space in which the vehicle can drive at least one target position possibility for the vehicle, in the event that the at least one target position possibility can be reached via a travel trajectory of the vehicle, located in the space in which the vehicle can drive. This allows the device to be used particularly in a parking assistance system.

According to a further development of the device, the at least one target position possibility is displayed to a driver of the vehicle via a user interface. The driver can, by way of example, select one of the target position possibilities and bring the vehicle manually to the target position.

According to a further development of the device, a target position can be selected by the driver of the vehicle via the user interface from the at least one target position possibility. A travel trajectory can, by way of example, be displayed to the driver, in order to reach the target position selected.

According to a further development of the device the sensing unit is configured to select a target position on the basis of specified criteria from the at least one target position possibility. By way of example, a preferred carrier position can be selected from various parking scenarios by means of an algorithm. This has the advantage that an optimum parking position can be automatically selected.

According to a further development of the device, the device includes a control unit configured to guide the vehicle automatically to the target position selected, wherein a travel trajectory of the vehicle is located in the determined space in which the vehicle can drive. On the basis of the accurately sensed coordinates of the space in which the vehicle can drive, the vehicle can be safely guided without danger to the vehicle or other high-way users to a target position.

According to a further development, the method includes the display to a driver of the vehicle via a user interface of at least one target position possibility for the vehicle, which can be reached via a travel trajectory of the vehicle, located in the space in which the vehicle can drive.

According to a further development, the method includes the selection of a target position from the at least one target position possibility by the driver and the automatic guiding of the vehicle to the target position selected.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
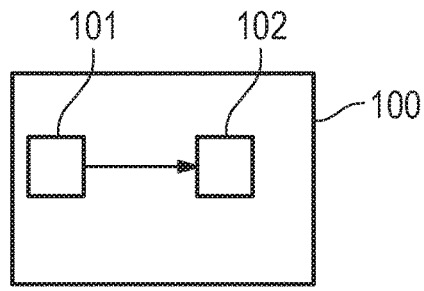
FIGS. 1 to 4 are block diagrams illustrating exemplary embodiments of the device.

FIG. 1 shows a device 100 for a vehicle for determining a space in which the vehicle can drive according to one exemplary embodiment. The vehicle in question can be an automobile, a truck, a motorcycle, or an agricultural tractor. The device 100 includes a sensing unit 101 configured for sensing spatial coordinates of at least one object in a vehicle environment of the vehicle. The sensing unit 101 can, by way of example, include optical sensors (cameras or laser sensors), radar sensors, or ultrasound sensors. The sensing unit 101 preferably includes at least one camera.

The sensing unit 101 may include a surround view system with more than one camera, making it possible to sense a three-dimensional vehicle environment of the vehicle. In particular, it is possible to sense objects in a vehicle environment of the vehicle at least up to a height above the highway surface, corresponding to the height of the vehicle above the highway surface.

The device 100 also includes a determining unit 102. The determining unit 102 is configured to receive the spatial coordinates of the at least one object in the vehicle environment of the vehicle that have been sensed by the sensing unit 101. The determining unit 102 also includes a memory, in which the received spatial coordinates of the at least one object are stored. In particular, when the vehicle itself moves, successive three-dimensional maps of the vehicle environment can be created, in which the space taken up by objects is identified. The determining unit 102 is configured, on the basis of the spatial coordinates of the at least one object sensed by the sensing unit 101 and the three-dimensional map, together with dimensions of the vehicle stored in the memory, to determine a space in which the vehicle can drive.

To this end, by way of example, in the three-dimensional map, in which the position of the vehicle is stored, those areas in which the sensing unit 101 has sensed an object can be marked as occupied. The space in which the vehicle can drive is then the area of the three-dimensional map which is not occupied and in which it is possible to arrange the vehicle in at least one position such that using the stored dimensions of the vehicle the space taken up by the vehicle does not overlap with an occupied space. Here, the space in which the vehicle can drive is determined such that the space can be reached by the vehicle by guiding the vehicle, without the vehicle touching or passing through the occupied space. In particular, the memory may also comprise data on navigation characteristics of the vehicle, by way of example a turning radius of the vehicle.

According to a further embodiment, the determining unit 102 may calculate at least one target position possibility for the vehicle, that is, a possibility of arranging the vehicle in the drivable space, wherein a travel trajectory, in order to reach the target position possibility, is located fully within the drivable space.

According to a further embodiment, the drivable space is determined in such a way that a safety distance is maintained. By way of example, a safety distance of 10 cm, 20 cm, or 50 cm from a space marked as occupied, thus a space in which the sensing unit 101 has sensed an object, can be maintained, so that this space is also marked as occupied and the drivable space is reduced accordingly.

Figure 2:
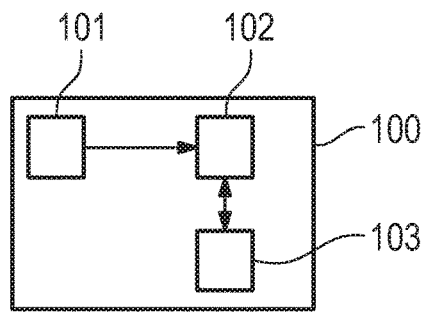

FIG. 2 shows a further embodiment. Here, the device 100 also has a user interface 103. The device 100 is configured to display the at least one calculated target position possibility via the user interface 103 to a driver of the vehicle.

According to a further embodiment, the driver of the vehicle via the user interface 103 can select a target position from the at least one target position possibility.

Figure 3:
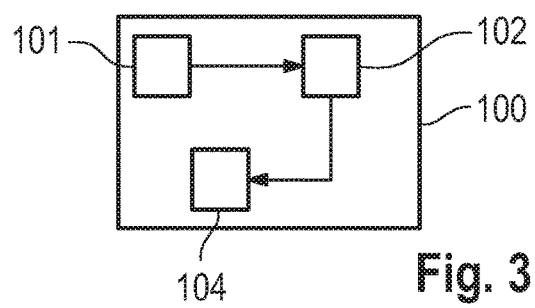

FIG. 3 shows a further embodiment, which is a further development of the embodiment shown in FIG. 1, wherein the device 100 also has a control unit 104. The determining unit 102 is configured to select a target position from the at least one target position possibility. The determining unit 102 can select the target position by way of example on the basis of specified criteria with the help of an algorithm. By way of example, the target position possibility can be selected from the at least one target position possibility, and determined as the target position, which can be reached via the shortest possible travel trajectory of the vehicle. The control unit 104 is configured to guide the vehicle automatically to the target position selected, wherein a travel trajectory of the vehicle is located in the space in which the vehicle can drive that has been determined. Here, the guiding along the travel trajectory can, in particular, also comprise multiple maneuvers such as driving backwards and forwards.

Figure 4:
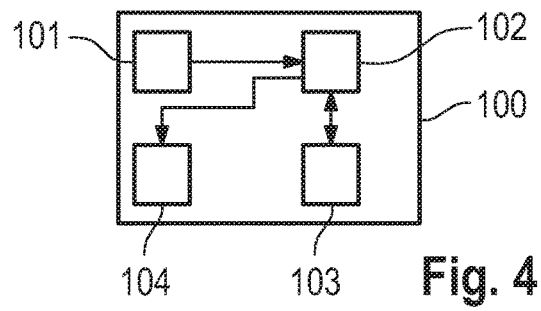

FIG. 4 shows a further embodiment which is a further development of the embodiment shown in FIG. 2. The device 100 has both a user interface 103 and a control unit 104. The device 100 is configured such that the driver of the vehicle via the user interface 103 can select a target position from the at least one target position possibility, which is displayed to the driver via the user interface 103. The control unit 104 is configured to guide the vehicle automatically to the target position selected, wherein a travel trajectory of the vehicle is located in the space in which the vehicle can drive that has been determined.

Figure 5:
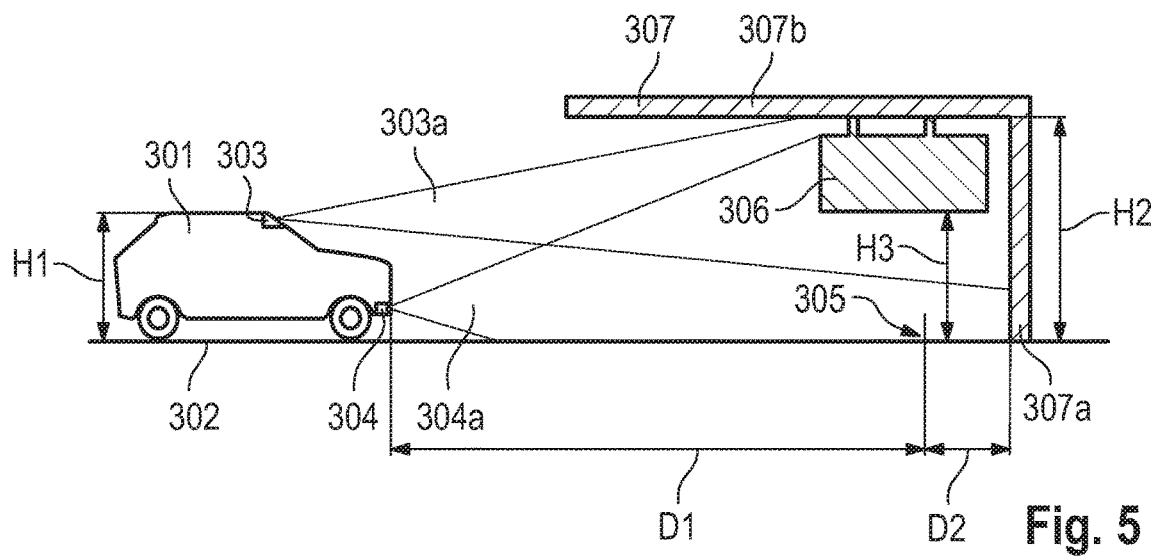
FIG. 5 is a cross-sectional view of an exemplary scenario to illustrate the device according to one exemplary embodiment.

FIG. 5 shows a cross-sectional view of an exemplary scenario to illustrate application of the device 100 (not shown in FIG. 5). A vehicle 301 is located on a highway surface 302. In the forward direction of travel of the vehicle 301 there is a garage 307, wherein a height H2 of a garage roof 307*b* of the garage 307 above the highway surface 302 is greater than the maximum height H1 of the vehicle 301 above the highway surface 302. On the garage roof 307*b* a box 306 is arranged. Here, an underside of the box 306 is at a height H3 above the highway surface 302. Here, the height H3 of box is smaller than the maximum height H1 of the vehicle 301.

The vehicle 301 has a first sensor 303, configured on a windshield of the vehicle 301, and able to sense a tapered first area 303*a* in front of the vehicle. The vehicle 301 also has a second sensor 304, configured on a front cover of the vehicle, and able to sense a tapered second area 304*a*. Here, the first sensor 303 and the second sensor 304 can in particular comprise optical sensors, for instance a camera for detecting an environment of the vehicle 301.

With the help of the first sensor 303 and the second sensor 304, it is possible to sense objects in a vehicle environment of the vehicle 301, that is, the box 306 and the garage 307. The invention is not restricted to this and in particular the vehicle can have a plurality of sensors configured on the vehicle. Through the various perspectives of the sensors it is possible to create a three-dimensional map of at least a part of the vehicle environment of the vehicle 301. The first sensor 303 and the second sensor are thus configured to sense three-dimensional coordinates of objects in the vehicle environment of the vehicle 301, for instance of the box 306 and of the garage 307.

The vehicle 301 also has a determining unit 102 (not shown in FIG. 5), which on the basis of coordinates of the box 306 and the garage 307 sensed by the first sensor 303 and the second sensor 304 and the dimensions of the vehicle 301 determines a space in which the vehicle 301 can drive. In the scenario shown in FIG. 5, the determining unit 102 determines that a space up to a permissible distance D1 from a front of the vehicle 301 is drivable. In this permissible distance D1 from the front of the vehicle 301 there is an end point 305, which is the point up to which the front of the vehicle 301 can be guided, without the vehicle 301 touching the box 306. This means that if a front of the vehicle 301 is moved beyond the end point 305 towards a wall 307a of the garage 307, the vehicle 301 will collide with the box 306. A space in which the vehicle can drive is therefore the space in which the front of the vehicle 301 is at least a minimum distance D2 from the wall 307a of the garage 307, wherein the minimum distance D2 is the distance of the end point 305 from the garage wall 307a.

According to a further embodiment, the determining unit calculates the drivable area in such a way that in addition a safety distance is maintained from the sensed object, for instance the box 306, or the garage 307, for instance of 10 cm, 20 cm or 50 cm.

Figure 6:
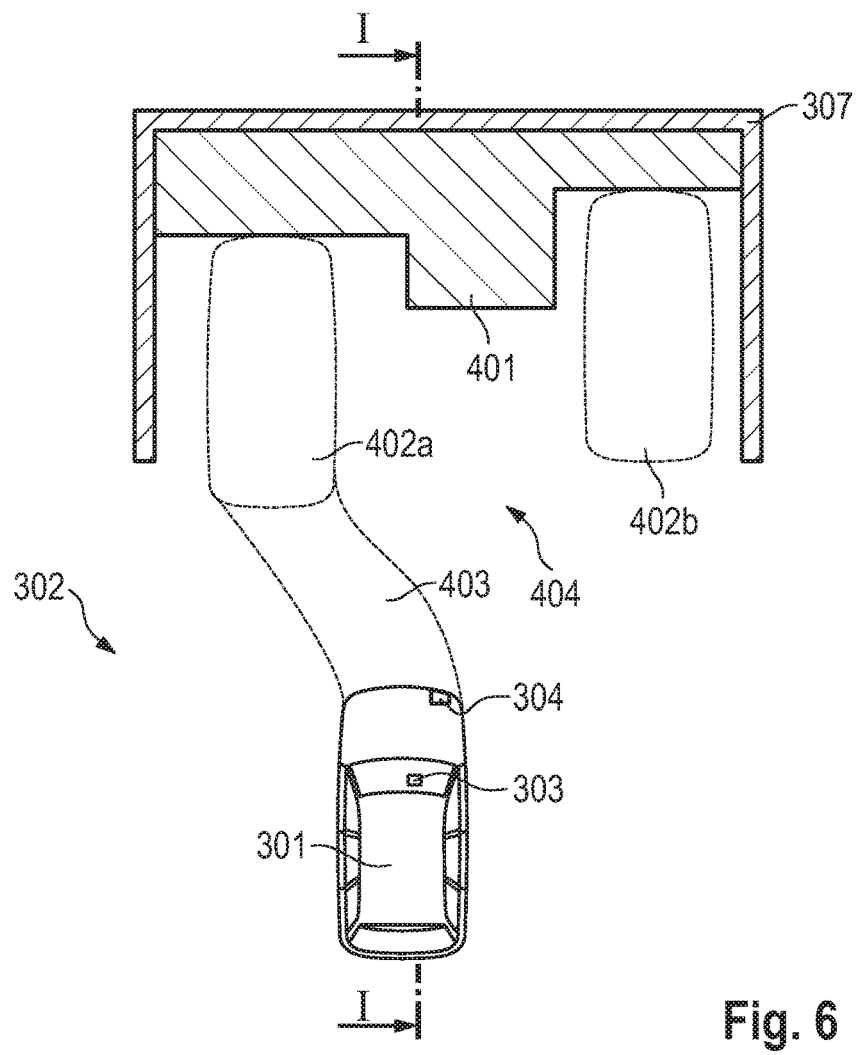
FIG. 6 is a top view of an exemplary scenario to illustrate the device.

FIG. 6 shows a top view of the exemplary scenario to illustrate the device of the invention 100. Here, an occupied area 401 is the area in which the vehicle 301 cannot be guided, without colliding with an object, for instance the box 306 or garage 307. Here, FIG. 5 corresponds to a cross-section along the axis I-I.

A space 404 in which the vehicle 301 can drive is the space which is not occupied, that is, the complement to the space 401. Furthermore, a first target position possibility 402a and a second target position possibility 402b are shown, which the vehicle can reach via travel trajectories, located in the space 404 in which the vehicle 301 can drive. In particular, the first target position possibility 402a can be reached via the first travel trajectory 403. The first target position possibility 402a and the second target position possibility 402b can, as described in the embodiments above, be displayed to a driver of the vehicle 103 via a user interface 103 (not shown in FIG. 6).

According to a further embodiment, the driver of the vehicle 301, via the user interface 103, can select a target position 402a from the first target position possibility 402a and the second target position possibility 402b, which here, by way of example, may be the same as the first target position possibility 402a.

According to a further embodiment, the trajectory 403 for reaching the selected target position 402a can be displayed to the driver via the user interface 103, whereupon the driver can independently guide the vehicle 301 to the target position 402a. According to a further embodiment, the device 100 comprises a control unit 104, which automatically guides the vehicle 301 along the travel trajectory 403 to the selected target position 402a.

Figure 7:
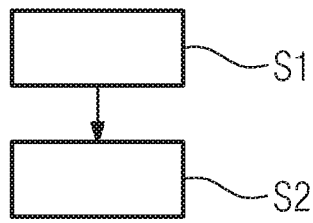
FIGS. 7-9 are flow charts to illustrate a method for determining a space in which a vehicle can drive according to various exemplary embodiments.

FIG. 7 shows a flow chart to illustrate a method for determining a space 404 in which a vehicle 301 can drive. The method comprises a first step S1 of sensing spatial coordinates of at least one object in a vehicle environment of the vehicle 301. Here the sensing of spatial of coordinates can, by way of example, take place by means of optical sensors, radar sensors or ultrasound sensors. The sensing of spatial coordinates of the at least one object 306 preferably takes place by means of at least two cameras of a surround view system. By comparing the coordinates of the at least one object sensed by the at least two cameras precise three-dimensional spatial coordinates of the at least one object can be calculated.

The method comprises a second step S2 of determining a space 404 in which the vehicle 301 can drive on the basis of the sensed spatial coordinates of the at least one object 306 and on the basis of specified dimensions of the vehicle 301. Here, a space 404 in which the vehicle 301 can drive, is a space into which the vehicle 301 can be brought without touching one of the at least one sensed objects. According to a further embodiment, a safety distance can also be factored in. In addition, a handling characteristic of the vehicle 301, for instance a turning circle of the vehicle 301, can be factored in.

To this end, by way of example, in a three-dimensional map, the area in which the at least one object is located can be marked as occupied. On the basis of the stored dimensions of the vehicle 301 the space 404 in which the vehicle 301 can drive can then be determined.

Figure 8:
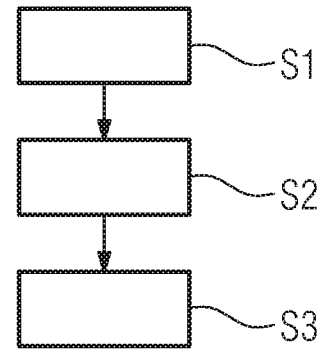

FIG. 8 shows a further embodiment of the present invention. In addition to the method shown in FIG. 4, in a further step S3 a signal is issued to a driver of the vehicle 301. The signal can, by way of example, be issued via a user interface 103. In doing so, target position possibilities are displayed to the driver of the vehicle, that is, positions to which the vehicle 301 via travel trajectories, which are located within the space 404 in which the vehicle 301 can drive, can be brought.

Figure 9:
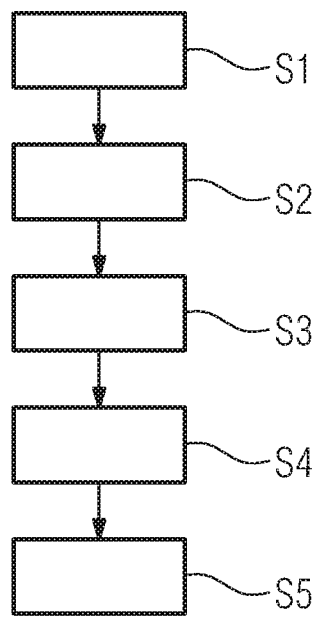

According to a further embodiment, as shown in FIG. 9, in a fourth step S4 at least one of the target position possibilities 402a, 402b for the vehicle 301, which can be reached via a travel trajectory of the vehicle 301, which is located in the space 404 in which the vehicle 301 can drive, is displayed to a driver of the vehicle 301 via a user interface 103.

In a fifth step S5, the vehicle is automatically guided to the target position selected, wherein a travel trajectory of the vehicle 301 is located fully in the space 404 in which the vehicle 301 can drive. By way of example, the guiding of the vehicle 301 is performed by a control unit 104.

The present invention is not restricted to this, in particular a target position can be automatically selected from the at least one target position possibility on the basis of specified criteria with the help of an algorithm, and according to a further embodiment the vehicle can be automatically guided to the target position selected.

The method can in particular also be used to accurately control a loading dock with a truck. To this end the loading dock is detected by the sensing unit 102 as an object. The truck is automatically guided in the area frequented by the trucks to the loading dock, until the truck is close enough to the loading dock. In particular, it is possible to prevent contact with the loading dock, wherein it can at the same time be ensured that the truck is located close enough to the loading dock.

The method may also be used for identifying signs indicating a height limit and arranged at the corresponding height. The sign is detected by the sensing unit 102 as an object. If a sign height is lower than the maximum height H1 of the vehicle, it is detected that the area below the sign is not drivable.

Furthermore, the method may be used for identifying overhanging objects on vehicles traveling in front.

The method may also be used to identify if a tunnel is high enough for a vehicle. The tunnel is detected as an object. If a height of the tunnel is less than the maximum height H1 of the vehicle, it is detected that the tunnel is not an area in which the vehicle can drive.

By way of example a plane on the highway surface and/or above the highway surface is used, in respect of which then, in particular as a function of the spatial coordinates of objects sensed by the sensing unit, a three-dimensional map of objects and the drivable space is created. In one arrangement, the plane concerned is a two-dimensional plane, stretching at a particular height over or above the vehicle surface, in particular horizontally. Here, the height can be set as a function of the height of the vehicle. By way of example, the height of the plane can correspond to the height of the vehicle or the plane can be arranged or spanned at a particular distance (height X) to the height of the vehicle, that is, (height of the vehicle)+(height X). Subsequently, in relation to this plane, in particular if this is located above the vehicle, what is referred to as an "occupancy map" can be created vertically in the direction of the highway surface, on the basis of the spatial coordinates of objects sensed by the sensing unit. Accordingly, alternatively or additionally to the normal "occupancy maps" or "occupancy grids" related to the high-way surface of the vehicle environment, an "occupancy map" related to a particular plane above the vehicle can be created. As a function of this alternative or additional "occupancy map", a trajectory can thus be determined not only in relation to the drivability of the space around the vehicle, that is, in relation to the highway surface, but rather alternatively or additionally also in relation to a trajectory plan in relation to the drivability of the space surrounding the vehicle, in particular in relation to objects which are not located on the highway surface, but are arranged at a certain height, by way of example suspended traffic signs or objects suspended from a garage or parking facility roof.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A parking assistance device for determining a space in which a vehicle can drive, comprising:
    at least one sensing unit for sensing spatial coordinates of at least one object in an environment of the vehicle; and
    a determining unit configured to determine the space in which the vehicle can drive on the basis of the spatial coordinates of the at least one object sensed by the sensing unit and on the basis of specified dimensions of the vehicle,
    wherein the sensing unit is configured to create a three-dimensional map of at least a part of the environment of the vehicle;
    wherein the three-dimensional map comprises positions of the at least one object and of the drivable space; and
    wherein the determining unit calculates on the basis of the space in which the vehicle can drive at least one target position possibility for the vehicle, in the event that the at least one target position possibility can be reached via a travel trajectory of the vehicle, located in the space in which the vehicle can drive.

2. The device as set forth in claim 1, wherein the sensing unit comprises optical sensors and/or laser sensors.

3. The device as set forth in claim 1, wherein the sensing unit comprises a surround view system.

4. The device as set forth in claim 1, further comprising a user interface and wherein the at least one target position possibility is displayed to a driver of the vehicle via a user interface.

5. The device as set forth in claim 4, wherein a target position can be selected by the driver of the vehicle via the user interface from the at least one target position possibility.

6. The device of as set forth in claim 5, further comprising a control unit configured to guide the vehicle automatically to the target position selected, wherein a travel trajectory of the vehicle is located in the space determined in which the vehicle can drive.

7. The device as set forth in claim 1, wherein the sensing unit is configured to select a target position on the basis of specified criteria from the at least one target position possibility.

8. The device of as set forth in claim 7, further comprising a control unit configured to guide the vehicle automatically to the target position selected, wherein a travel trajectory of the vehicle is located in the space determined in which the vehicle can drive.

9. A parking assistance method for determining a space in which a vehicle can drive, comprising:
    sensing spatial coordinates of at least one object in an environment of the vehicle; and
    determining the space in which the vehicle can drive on the basis of the sensed spatial coordinates of the at least one object and on the basis of specified dimensions of the vehicle;
    creating a three-dimensional map of at least a part of the environment of the vehicle, the three-dimensional map comprising positions of the at least one object and of the drivable space; and
    calculating, on the basis of the space in which the vehicle can drive, at least one target position possibility for the vehicle, in the event that the at least one target position possibility can be reached via a travel trajectory of the vehicle, located in the space in which the vehicle can drive.

10. The method as set forth in claim 9, further comprising displaying to a driver of the vehicle via a user interface at least one target position possibility for the vehicle which can be reached via a travel trajectory of the vehicle, located in the space in which the vehicle can drive.

11. The method as set forth in claim 10 further comprising:
    receiving a target position from the at least one target position possibility selected by the driver; and
    automatically guiding the vehicle to the target position selected.

12. A vehicle comprising:
    a parking assistance device for determining a space in which the vehicle can drive, including:
        at least one sensing unit for sensing spatial coordinates of at least one object in an environment of the vehicle; and
        a determining unit configured to determine the space in which the vehicle can drive on the basis of the spatial coordinates of the at least one object sensed by the sensing unit and on the basis of specified dimensions of the vehicle, wherein the sensing unit is configured to create a three-dimensional map of at least a part of the environment of the vehicle;

wherein the three-dimensional map comprises positions of the at least one object and of the drivable space; and wherein the determining unit calculates on the basis of the space in which the vehicle can drive at least one target position possibility for the vehicle, in the event that the at least one target position possibility can be reached via a travel trajectory of the vehicle, located in the space in which the vehicle can drive.

* * * * *